United States Patent
Kosmiskas

(10) Patent No.: US 9,875,099 B2
(45) Date of Patent: Jan. 23, 2018

(54) COMPUTER-IMPLEMENTED METHOD AND SYSTEM FOR EXECUTING ANDROID APPS NATIVELY ON ANY ENVIRONMENT

(71) Applicant: MechDome, Inc., San Mateo, CA (US)

(72) Inventor: Mario Kosmiskas, San Mateo, CA (US)

(73) Assignee: MechDome, Inc., San Mateo, CA (US)

( * ) Notice: Subject to any disclaimer, the term of this patent is extended or adjusted under 35 U.S.C. 154(b) by 0 days.

(21) Appl. No.: 15/157,824

(22) Filed: May 18, 2016

(65) Prior Publication Data

US 2017/0031680 A1 Feb. 2, 2017

Related U.S. Application Data

(60) Provisional application No. 62/197,101, filed on Jul. 27, 2015.

(51) Int. Cl.
*G06F 9/45* (2006.01)
*G06F 9/44* (2006.01)

(52) U.S. Cl.
CPC . *G06F 8/76* (2013.01); *G06F 8/52* (2013.01)

(58) Field of Classification Search
CPC ....................................................... G06F 8/76
USPC ................................................. 717/137–143
See application file for complete search history.

(56) References Cited

U.S. PATENT DOCUMENTS

| | | | | |
|---|---|---|---|---|
| 6,691,306 B1* | 2/2004 | Cohen | ................. | G06F 9/30174 703/26 |
| 6,802,056 B1* | 10/2004 | Chaiken | .................... | G06F 8/52 717/136 |
| 7,127,707 B1* | 10/2006 | Mishra | ..................... | G06F 8/423 717/136 |
| 7,350,199 B2* | 3/2008 | Ito | ....................... | G06F 17/2247 717/137 |
| 8,230,402 B2* | 7/2012 | Chen | ................... | G06F 9/45504 717/136 |
| 8,332,828 B2* | 12/2012 | Vargas | ...................... | G06F 8/51 717/136 |
| 8,370,818 B2* | 2/2013 | Osminer | ............. | G06F 9/44589 717/140 |

(Continued)

OTHER PUBLICATIONS

Fan et al, "Migrating User Interfaces in Native Mobile Applications: Android to iOS", IEEE/ACM International Conference on Mobile Software Engineering and Systems, pp. 210-213, 2016.*

(Continued)

*Primary Examiner* — Anil Khatri
(74) *Attorney, Agent, or Firm* — Kanika Radhakrishnan; Evergreen Valley Law Group

(57) ABSTRACT

A method for executing Android apps natively on any environment comprises converting one or more Android applications to a binary format of other applications in the Host Operating System. The Android applications are in one of a source format and a binary format. Further, all equivalent components are replaced from a standard Android environment with ones provided by the Host OS using the Host Operating System's capabilities. Furthermore, Android applications are executed natively by a Host Operating System. Moreover, the method includes mixing Android generated with content created by the Host Operating System to generate a final screen and the user views and interacts with the final screen.

18 Claims, 10 Drawing Sheets

(56) References Cited

U.S. PATENT DOCUMENTS

| | | | | |
|---|---|---|---|---|
| 8,656,372 | B2* | 2/2014 | Vargas | G06F 8/51 717/108 |
| 8,826,145 | B1* | 9/2014 | Kirkpatrick | G06F 17/30867 715/239 |
| 8,898,443 | B2* | 11/2014 | Reeves | G06F 13/14 713/1 |
| 9,002,864 | B1* | 4/2015 | Payne | G06F 17/30876 707/756 |
| 9,063,792 | B2* | 6/2015 | Ali | G06F 9/5077 |
| 9,081,896 | B1 | 7/2015 | Efremov | |
| 9,235,704 | B2* | 1/2016 | Wootton | G06F 21/564 |
| 9,349,002 | B1* | 5/2016 | Zhang | G06F 21/56 |
| 9,361,163 | B2* | 6/2016 | Yuen | G06F 9/54 |
| 9,530,016 | B1* | 12/2016 | Pomerantz | G06F 21/554 |
| 9,619,216 | B2* | 4/2017 | Wisgo | G06F 8/52 |
| 2014/0189679 | A1 | 7/2014 | Adams et al. | |
| 2014/0201807 | A1 | 7/2014 | White et al. | |

OTHER PUBLICATIONS

Merwe et al, "Generation of Library Models for Verification of Android Applications", ACM SIGSOFT Software Engineering Notes, vol. 40 No. 1, pp. 1-5, 2015.*
Andrus et al, "Cider: Native Execution of iOS Apps on Android", ACM, pp. 367-381, 2014.*
Wei et al, "ProfileDroid: Multi-layer Profiling of Android Applications", ACM, pp. 137-148, 2012.*
Fedler et al, "Native Code Execution Control for Attack Mitigation on Android" ACM, pp. 15-20, 2013.*
Bayrado et al, "An Evaluation of Binary XML Encoding Optimizations for Fast Stream Based XML Processing", ACM, pp. 345-354, 2004.*
Wu et al, "Towards a Binary Integrity System for Windows", ACM, pp. 503-507, 2011.*
Feiner et al, "Comprehensive Kernel Instrumentation via Dynamic Binary Translation", ACM, pp. 135-146, 2012.*
International Search Report & Written Opinion dated Sep. 29, 2016; PCT/US2016/041723.

* cited by examiner

General Architecture

Android Environment

Android Apps Running on a Host OS

COMPUTER-IMPLEMENTED METHOD AND SYSTEM FOR EXECUTING ANDROID APPS NATIVELY ON ANY ENVIRONMENT

TECHNICAL FIELD

Embodiments of the disclosure relate generally to operating systems and Android apps. Embodiments relate more particularly to a computer-implemented method and system for executing Android Apps natively on any environment (non-Android devices).

BACKGROUND

An Android app is a software application running on the Android platform and is specifically designed for a smartphone or a tablet PC running on the Android OS. However, Android apps depend on a runtime environment provided by the Operating System in order to execute. The Android Operating System has been designed to be ported to multiple devices allowing existing apps to run unmodified on those devices.

A majority of the Android OS subsystems is required to provide the runtime environment for running apps. Some of them are optional and vary based on the capabilities of the computing platform. Android was designed with this flexibility of device capabilities allowing the Android Operating System to be ported to a different range of devices. As a result, Android Apps cannot be run on any Host Operating System other than Android.

An existing solution to provide access to Android apps in a foreign Operating System is to use a Virtual Machine. Third party solutions exist with varying capabilities of the virtual environment. Other solutions also exist to run Android Virtual Machines in a cloud host and stream the output of the virtual display down to a different device giving the impression of running Android locally.

Irrespective of the various solutions mentioned above, all Virtual Machine based solutions share the same design ie. a Virtual Machine executes all the necessary Android subsystems to run apps, isolating the Android environment from the host. However, there are several problems that arise with the design.

One such problem requires the users to change their behavior while interacting with host apps and virtualized Android apps. This happens because of the varying semantics of the host OS and Android apps. Consequently, the users are frustrated and confused of the switching underlying OS. Further, the apps may be visually very different as the host OS and Android are not designed with the same visual guidelines. Another problem arises as a result of varying file system architecture. Data is not transparently shared between the Host and virtualized Android OS. For instance, if the Host OS has a contact list, the contact list will not be available in the visualized Android. In an attempt to improve integration, subsets of data can be synchronized between the Host OS and virtualized Android OS. Similarly, apps of the Host OS and Android OS cannot interact directly. Android OS uses a catalog of installed apps maintained by the Package Manager Service. None of the Host apps are listed there making them invisible to all apps in the visualized Android environment. The same applies to the Host OS wherein Android apps cannot be reached via native Inter-Process Communication (IPC) mechanisms, making them generally unreachable to host OS apps.

Further, an entire VM is required even if the user requires access to a single Android app. The VM needs to be started with all necessary components to support the Android runtime. The amount of resources used by the environment may greatly exceed the resources needed by the Android app itself. The high resource requirement prevents VMs from being deployed to devices other than servers and desktops, such as mobile phones and tablets.

Furthermore, Android is designed to be executed in a single computing environment. This limits cloud environments where a large set of hosts is available. It is not possible to spread the computation of a single user among multiple hosts, the entire VM has to be moved to a different host for load balancing. Similarly, starting and stopping the VM in a cloud environment is a resource intensive and time consuming operation.

In the light of the above discussion, there appears to be a need for executing Android Apps natively on any environment.

OBJECTIVE OF INVENTION

The principal objective of the embodiments herein is to provide a computer-implemented method for executing Android apps natively on any environment.

Another objective of the embodiments herein is to convert Android apps to a format of apps in a Host OS. The converted Android apps are then allowed to be distributed and managed using the regular tools, processes and procedures for the Host OS.

Yet another objective of the embodiments herein is to provide a consistent user experience between Android apps and other native apps. A user should interact with Android apps the same way he/she does with other native apps.

Another objective is for Android apps to be self contained. This is required for Host Operating Systems which enforce sand boxing.

SUMMARY

The above-mentioned needs are met by a computer-implemented method, computer program product and system for executing Android apps natively on any environment.

An example of a computer-implemented method for executing Android apps natively on any environment includes converting one or more Android applications to a binary format of other applications in the Host Operating System, wherein the Android applications are in one of a source format and a binary format. Further, the computer-implemented method includes replacing all equivalent components from a standard Android environment with ones provided by the Host OS thereby using the Host Operating System's capabilities. Furthermore, the computer-implemented method includes executing Android applications natively by a Host Operating System. Moreover, the computer-implemented method includes mixing Android generated with content created by the Host Operating System to generate a final screen, wherein the user views and interacts with the final screen.

An example of a computer-program product for executing Android apps natively on any environment includes converting one or more Android applications to a binary format of other applications in the Host Operating System, wherein the Android applications are in one of a source format and a binary format. Further, the computer-program product includes replacing all equivalent components from a standard Android environment with ones provided by the Host OS thereby using the Host Operating System's capabilities.

Furthermore, the computer-program product includes executing Android applications natively by a Host Operating System. Moreover, the computer-implemented method includes mixing Android generated with content created by the Host Operating System to generate a final screen, wherein the user views and interacts with the final screen.

An example of a system for executing Android apps natively on any environment includes a computing device operated by a user. Further, the system includes a processor coupled within the computing device and configured to perform the method of executing Android apps natively on any environment: converting one or more Android applications to a binary format of other applications in the Host Operating System, wherein the Android applications are in one of a source format and a binary format; replacing all equivalent components from a standard Android environment with ones provided by the Host OS thereby using the Host Operating System's capabilities; executing Android applications natively by a Host Operating System; and mixing Android generated with content created by the Host Operating System to generate a final screen, wherein the user views and interacts with the final screen.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a computer-implemented method and system for executing Android apps natively on any environment. The following detailed description is intended to provide example implementations to one of ordinary skill in the art, and is not intended to limit the invention to the explicit disclosure, as one or ordinary skill in the art will understand that variations can be substituted that are within the scope of the invention as described.

Android apps can instead run natively on other computing platforms avoiding the restrictions and limitations previously described. In order to make it possible the Android runtime must be ported to the desired computing environment and architectural changes are needed to the Android runtime to allow it to run on a foreign Operating System. The enhancements and architectural changes are the subject of this invention.

Environment Block Diagram

Figure 1:
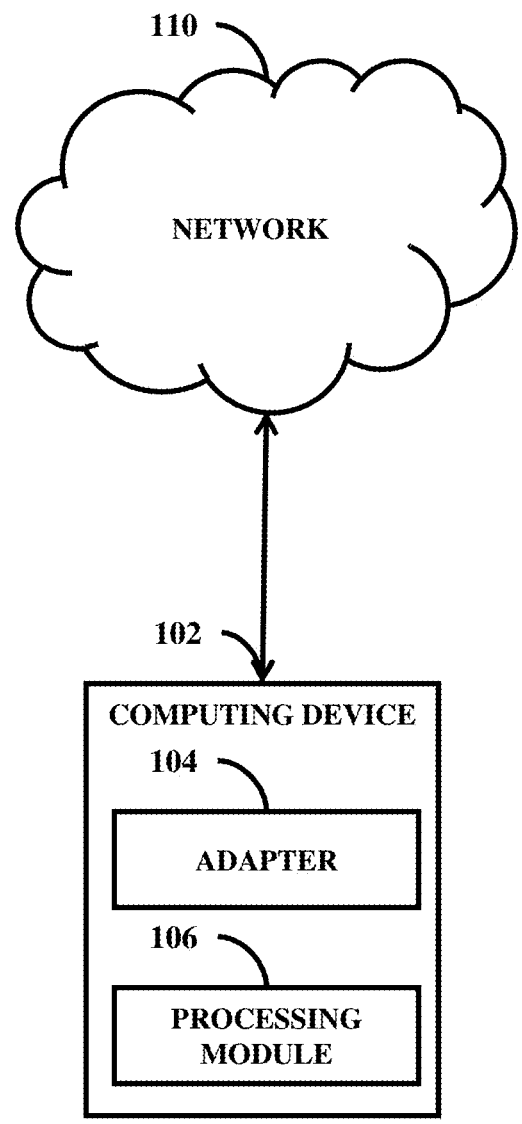
FIG. 1 is a block diagram of the environment, according to the embodiments as disclosed herein.

FIG. 1 is a block diagram of the environment, according to the embodiments as disclosed herein. The environment 100 includes a computing device 102, an adapter 104, a processing module 106 and a network 108.

Typically, the computing device 102 is a portable computing device. Examples of the computing device 102 include, but are not limited to, a personal computer (PC), laptops, a mobile phone, a tablet device, a personal digital assistant (PDA), a car and a smart watch. Further, the computing device 102 is a portable electronic or a desktop device configured with a user interface (not shown in FIG. 1) to interact with a user. Examples of the user interface include, but are not limited to, display screen, keyboard, mouse, light pen, appearance of a desktop, illuminated characters and help messages.

A Host Operating System (OS) is the primary OS installed on a computing device that interacts with the underlying hardware. In most cases, there is only one host OS. Other OS's are known as virtual OS and may operate within the Host OS.

Further, the computing device 102 includes the adapter 104 and the processing module 106. The adapter 104 converts necessary data to a format that a Host Operating System requires. The processing module 106 is configured with a non-transitory computer-readable medium, the contents of which causes the computing device 102 to perform the method disclosed herein.

Network link(s) involved in the system of the present invention may include any suitable number or arrangement of interconnected networks including both wired and wireless networks. By way of example, a wireless communication network link over which mobile devices communicate may utilize a cellular-based communication infrastructure. The communication infrastructure includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link may further include, or alternately include, a variety of communication channels and networks such as WLAN/Wi-Fi, WiMAX, Wide Area Networks (WANs), and Bluetooth.

It should be appreciated by those of ordinary skill in the art that FIG. 1 depicts the computing device 102 in an oversimplified manner, and a practical embodiment may include additional components and suitably configured processing logic to support known or conventional operating features that are not described in detail herein.

The method described herein allows Android apps to be executed natively by the Host OS. The term "natively" refers to developing applications specific for a platform/device. The Android apps share the same services and have the same capabilities of other native apps running in the environment or Host OS. Specifically, the Android apps are converted to a binary format of apps in the Host OS. Subsequently, the converted Android apps to be distributed and managed using the regular tools, processes and procedures for the platform, for instance, Apple™ App Store.

Further, Android generated content is mixed with content created/managed by the Host OS to generate a final screen. The final screen is displayed to the user who can then interact with the content.

Operational Flow Chart

Figure 2:
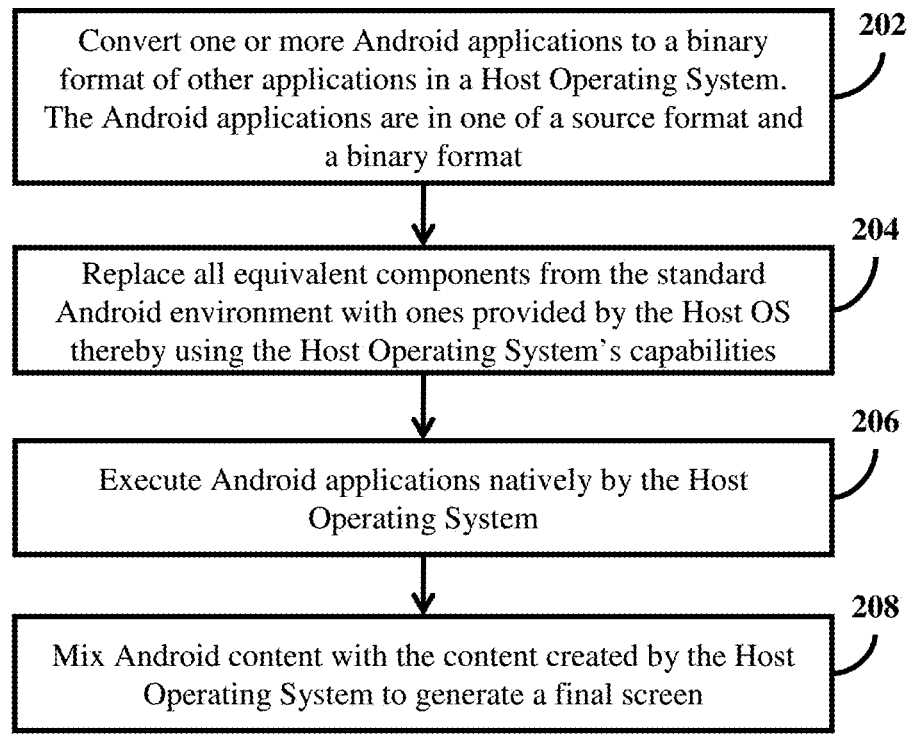
FIG. 2 is a flowchart describing a method for executing Android apps natively on any environment, according to the embodiments as disclosed herein.

FIG. 2 is a flowchart describing a method for executing Android apps natively on any environment, according to the embodiments as disclosed herein. The flowchart begins at step 202.

At step 202, one or more Android applications are converted to a binary format of other applications in a Host Operating System. The Android applications are in one of a source format or binary format. The converted Android app is indistinguishable from other apps from that platform/Host OS.

The Shell app (FIG. 4*a*) wraps every converted Android app with the components needed to run Android apps in the Host OS.

The converted Android apps are allowed to be distributed and managed using regular tools, processes and procedures for the Host OS, for instance Apple™ App store.

At step 204, all equivalent components are replaced from a standard Android environment with ones provided by the Host OS thereby using the Host Operating System's capabilities.

The equivalent components include, but are not limited to, visual features, capabilities and services of the Host OS.

The Android apps share the same services and have the same capabilities of other native applications running in the Host OS.

Further, the components of the Android framework required to run the Android applications varies per application and the Host OS.

At step 206, Android applications are natively executed by the Host Operating System. The Android applications will share the same services and have the same capabilities of other native apps running in the environment/Host OS.

The original Android applications along with the required components of the Android framework and adapters are bundled together to create an executable unit capable of being installed, launched, executed and managed by the Host OS. It will be appreciated to those skilled in the art that, the exact components of the Android framework needed to run the app vary per app and Host OS.

The Android services are configured to match the capabilities of the Host OS.

Further, alternatives for running Android apps are provided that are automatically used based on the capabilities of the Host OS. The alternatives are one of a single runtime in the form of a shared library/framework and a cloud runtime environment for Android. By default, a static library bundled along with each app is used for running the Android apps.

The method described herein provides alternatives for Binder IPC (FIG. 7) that are automatically used based on the capabilities of the Host OS. The alternatives are as follows:

a) Port the Binder Driver and adapt the Binder framework to fully support the Binder IPC (702)

b) Eliminate the use of Binder IPC—When running in a single process Inter-Process Communication (IPC) mechanisms like Binder are not required. This method includes a way to transparently remove the usage of Binder without changing or affecting the functionality of the original app. Specifically, when running in a single process, both targets of the Binder communication are available hence the endpoints are directly connected. (704)

c) Replace Binder IPC with other IPC mechanisms—When running on environment where IPC mechanisms are available this mechanism allows for a mapping between them. (706)

d) Binder over IP—In cloud environments Android apps may be running on different physical hosts. Binder calls will be encapsulated over IP and sent to physical host where the target of the communication is being executed. (708)

Further, when the Host OS is running in a single process, the app logic, Java™ Runtime, required components of the Android Framework and adapters can be encapsulated in the deployment. An alternate configuration is to provide a single runtime (Java™ Runtime, Android Framework and adapters) in the form of a shared library/framework that multiple Android apps in the same Host OS can use. Another alternative is to use the cloud as the runtime environment for Android (FIG. 4*c*):

a. Users interact with the cloud apps through a computing device (smart phone, tablet, PC, etc) which provides input and output. The computing device may not be running Android, it could be any Host OS.

b. An app that establishes a session with the Cloud Android Environment must be installed in the user's computing device. Alternatively a library embedded in other apps can establish or connect to existing sessions. The "Directory & Core Services" keeps a list of apps a session is entitled to and determines the physical server which will be hosting each app. This service also relocates apps to different hosts based on policy or in case of a server failure.

c. To interact with apps running in the cloud there could be either independent apps in the user's computing device, each mapped to an individual app in the cloud or a single app which allows the user to switch between cloud apps. This/These app(s) redirects user input to the cloud and provides output (graphics, sound, haptic feedback, etc) for the apps running in the cloud. The local app also allows for cloud apps to interact with other apps in the local computing device (e.g. IPC, copy/paste, etc)

d. The Cloud Android Environment is not restricted to a single physical host. Every app a user requests can be instantiated in a different physical host, allowing for optimal utilization of cloud resources.

e. Apps in the Cloud Android Environment communicate with the appropriate variation of Binder IPC depending if the communicating apps are in the same host or remote.

f. An app's lifecycle in the Cloud Android Environment can be optimized for resource management. Even typical services that are usually running all the time in an Android device may not need to be up all the time in the Cloud. Since every app or service is a simple process the Android Cloud Environment can choose to start a service in response to a user request and immediately terminate it. The physical location of a service can also be dynamically selected based on policy.

g. All output generated by apps running in the Cloud is sent to the app(s) running in the user's computing device.

h. A user can pause a session with the Android Cloud Environment and resume it later even on a different physical computer.

i. The files and databases created by apps running in the Android Cloud

Environment can be automatically redirected to a cloud storage service instead of using the current host's storage. This approach allows for apps to be transparently moved to any physical host in the cloud.

j. An Android Cloud Environment can be configured for an individual or by an Enterprise for its employees. The apps available and their integration with Enterprise resources are configured by the company's IT department.

At step 208, Android content is mixed with the content created/managed by the Host Operating System to generate a final screen. The user can then view and integrate with the final screen.

The flow chart ends at step 208.

In some embodiments, the method described herein may be performed through the following phases:

1. The first phase includes a product development phase that ports the Android runtime to a new Host OS. Here, the capabilities of the Host OS are identified and necessary adapters are created.
2. Upon completion of the first phase, the second phase includes a conversion process wherein apps are for that Host OS are created.

Once the above phases are complete, Android apps can now be automatically converted to run in that Host OS. It will be appreciated to those skilled in the art that, there is no requirement to develop adapters when converting the Android apps.

The method described herein is beneficial for several reasons as described below:

1. The method achieves full portability of Android apps to any environment with minimal or zero effort from the app's developer. The method is fully automated.
2. The Android apps run at full speed of the computing environment and can also be fully distributed in a cloud environment. For instance, mobile phones, tablets, desktops, laptops, smart watches, cars and so on.
3. The method eliminates user frustration and greatly reduces development costs to support multiple platforms.
4. The Android apps can adopt the theme of the Host OS to follow the same visual guidelines of other apps.
5. The method provides access to the same data, thereby eliminating the need for synchronization and replication.
6. The Android apps can be deployed to any platform including iOS.
7. The Android apps can be scalable and distributable in a cloud environment.

Block Diagram of Exemplary Application Flow

Figure 3:
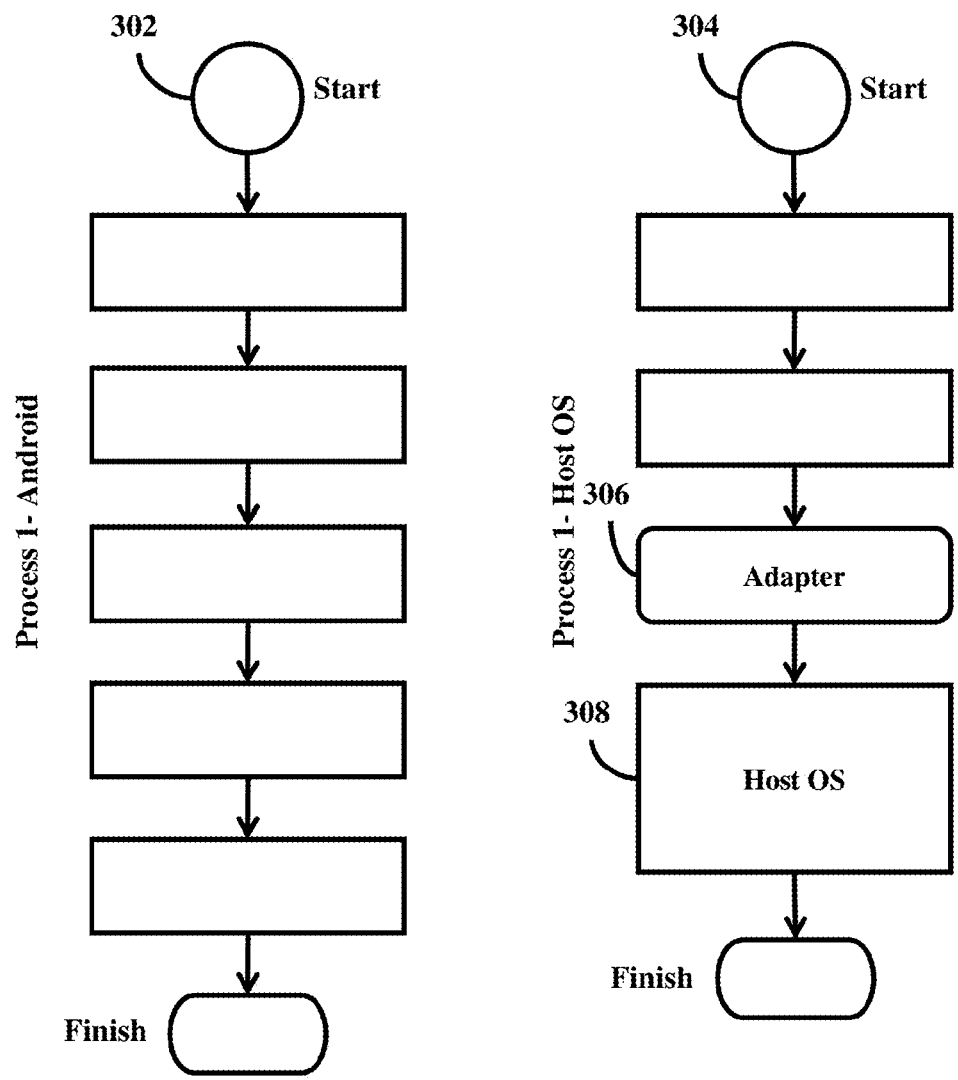
FIG. 3 is a block diagram illustrating exemplary application flows in an Android OS and a Host OS, according to the embodiments as disclosed herein.

FIG. 3 is a block diagram illustrating exemplary application flows in an Android OS and a Host OS, according to the embodiments as disclosed herein.

The application flow 302 illustrates the process in an Android OS while the application flow 304 illustrates the same process in a Host OS.

The application flow 304 includes an adapter 306 to convert necessary data to a format the Host OS 308 requires. Subsequently, control is transferred to the Host OS 308.

Block Diagram Illustrating Configurations of Android Framework

Figure 4A:
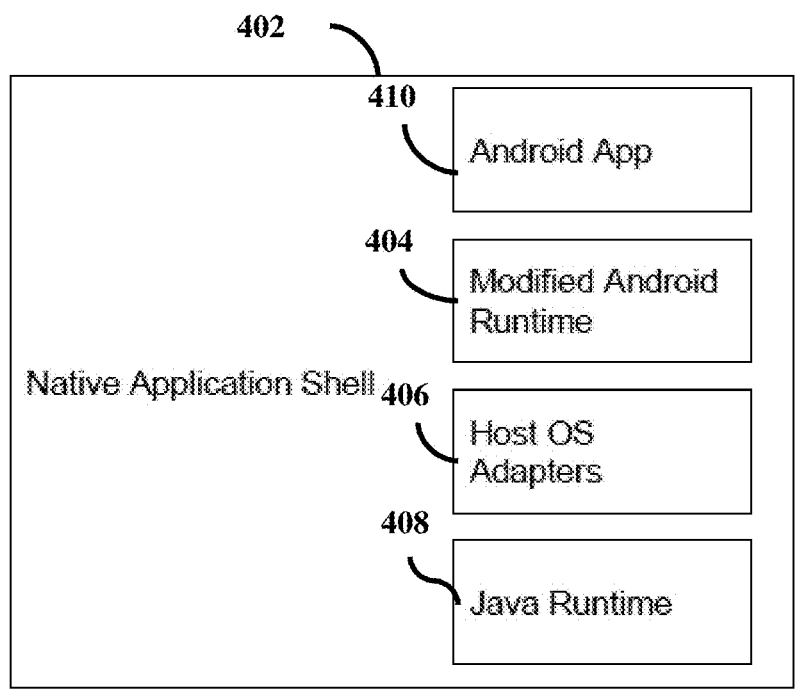
FIG. 4a is a block diagram illustrating the general architecture of an Android app running on a Host OS different than Android, according to the embodiments as disclosed herein.

FIG. 4a is a block diagram illustrating the general architecture of an Android app running on a Host OS different than Android, according to the embodiments as disclosed herein.

Figure 7:
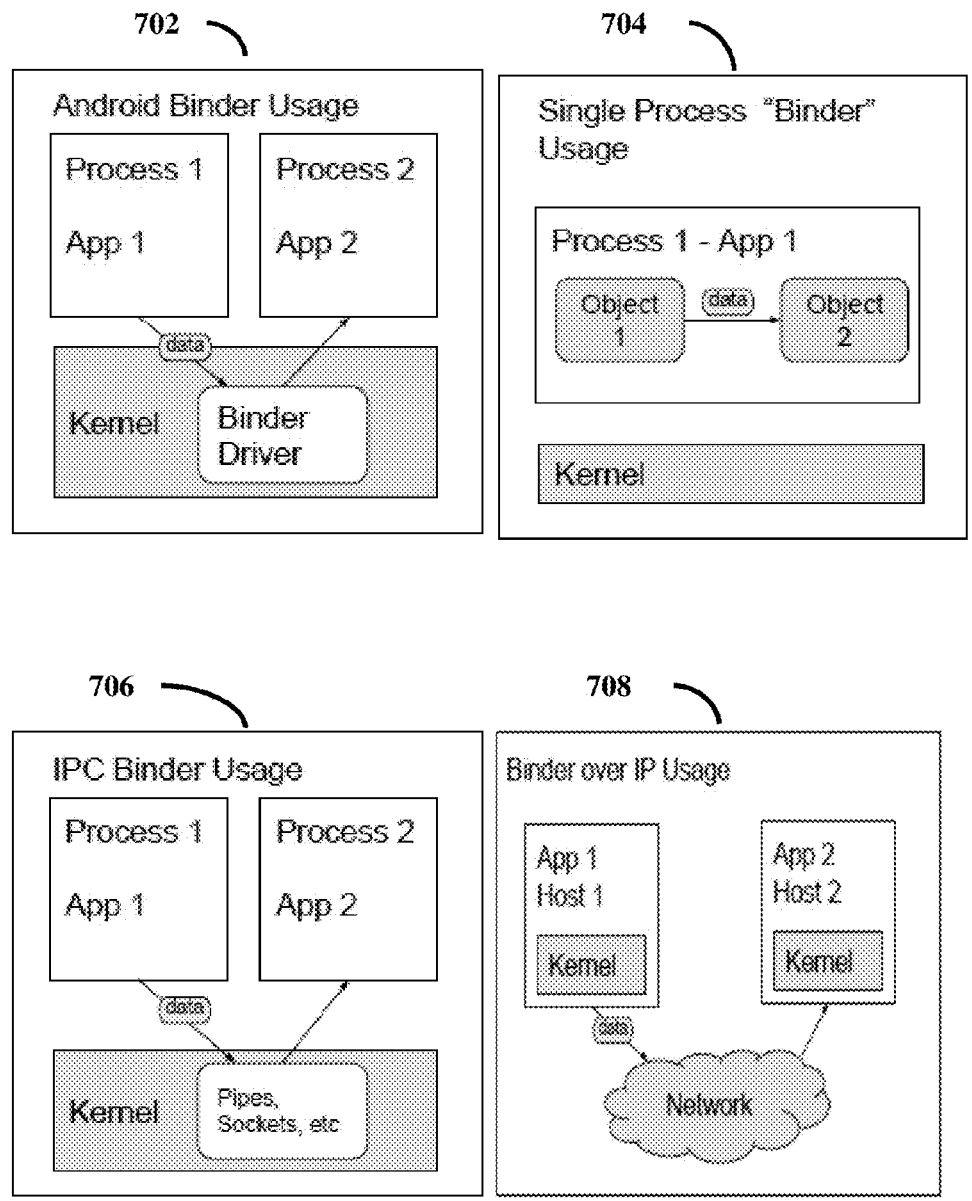
FIG. 7 shows the alternative implementations of the Binder Inter-Process Communication (IPC), according to the embodiments as disclosed herein.

The general architecture of the converted Android app includes a Shell App 402, modified Android Framework (or Runtime) 404, Host OS Adapters 406, Java™ Runtime 408 and Android App 410 (being converted). When running in a single process the Java™ Runtime 408, Customized Android Framework 404 and the Android app 410 can be encapsulated in the deployment. If an ahead-of-time compiler is used there will be no discrete Java™ Runtime to deploy. In this case there is no need for Binder IPC since all components share the same process (FIG. 7-702).

The general architecture provides an execution mode that is required for OS's that enforce app encapsulation. It can also be used in Desktop and Cloud environments to enforce isolation and create a stable, secure environment.

The original Android applications along with the required components of the Android framework and adapters are bundled together to create an executable unit capable of being installed, launched, executed and managed by the Host OS. It will be appreciated to those skilled in the art that, the exact components of the Android framework needed to run the app vary per app and Host OS.

Further, when the Host OS is running the Android app in a single process, the app logic, Java™ Runtime, required components of the Android Framework and adapters can be encapsulated in the deployment.

Figure 4B:
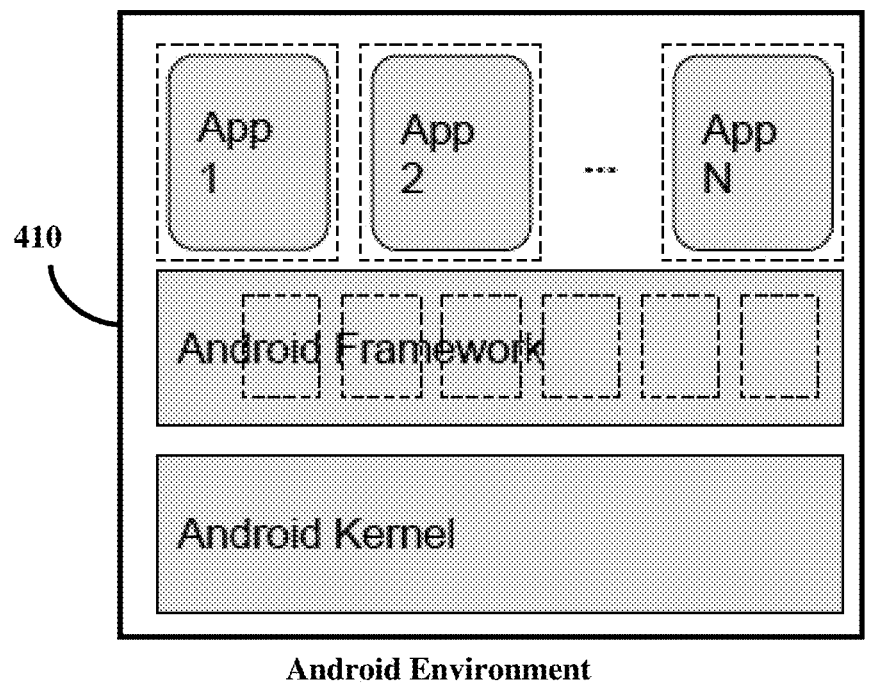
FIG. 4b is a block diagram illustrating the standard Android environment and Framework executing multiple apps on behalf of a user and the modified Framework running in a foreign Operating System executing a single Android app, according to the embodiments as disclosed herein.
Figure 4B:
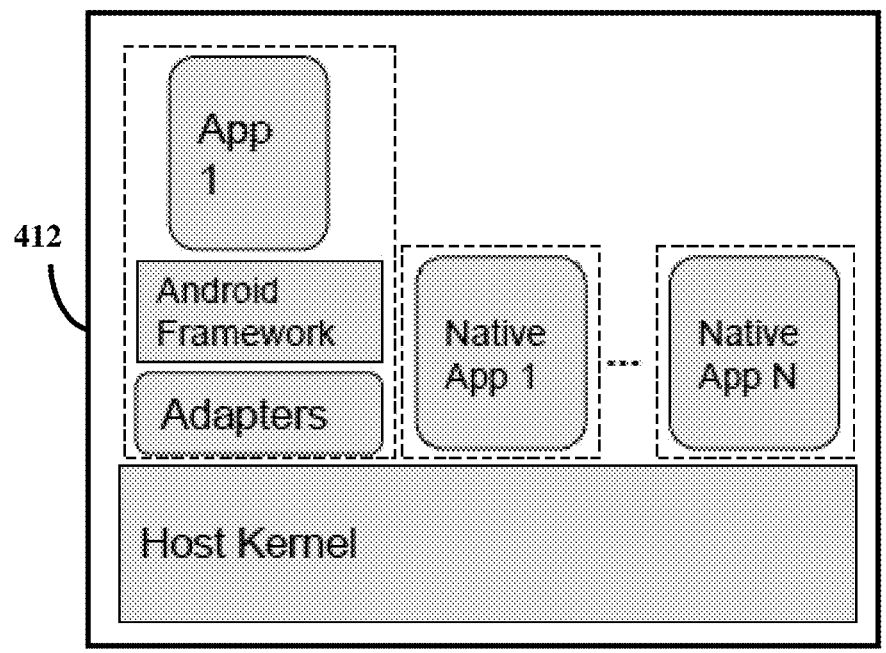

FIG. 4b is a block diagram illustrating the standard Android environment and Framework executing multiple apps on behalf of a user and the modified Framework running in a foreign Operating System executing a single Android app, according to the embodiments as disclosed herein.

Communication between Android apps can use the payload of Binder calls (Parcels) mapped to Inter Process Communication (IPC) mechanisms provided by the Host OS (FIG. 7 706). Alternatively, if allowed by the Host OS the Binder kernel driver can be installed and the standard Binder communication mechanism can be used (FIGS. 7-702).

The Android environment 410 illustrates the Android Kernel, Android Framework and multiple apps, for instance, App 1, App2 and App N, as found on standard Android devices The Android app running on a Host OS 412 describes a modified Framework running in a foreign Operating System executing a single Android app. Further, the Android apps and native apps are treated the same by the Host OS. The Host OS may be capable of running multiple Android apps simultaneously.

The dotted lines represent process boundaries.

Figure 4C:
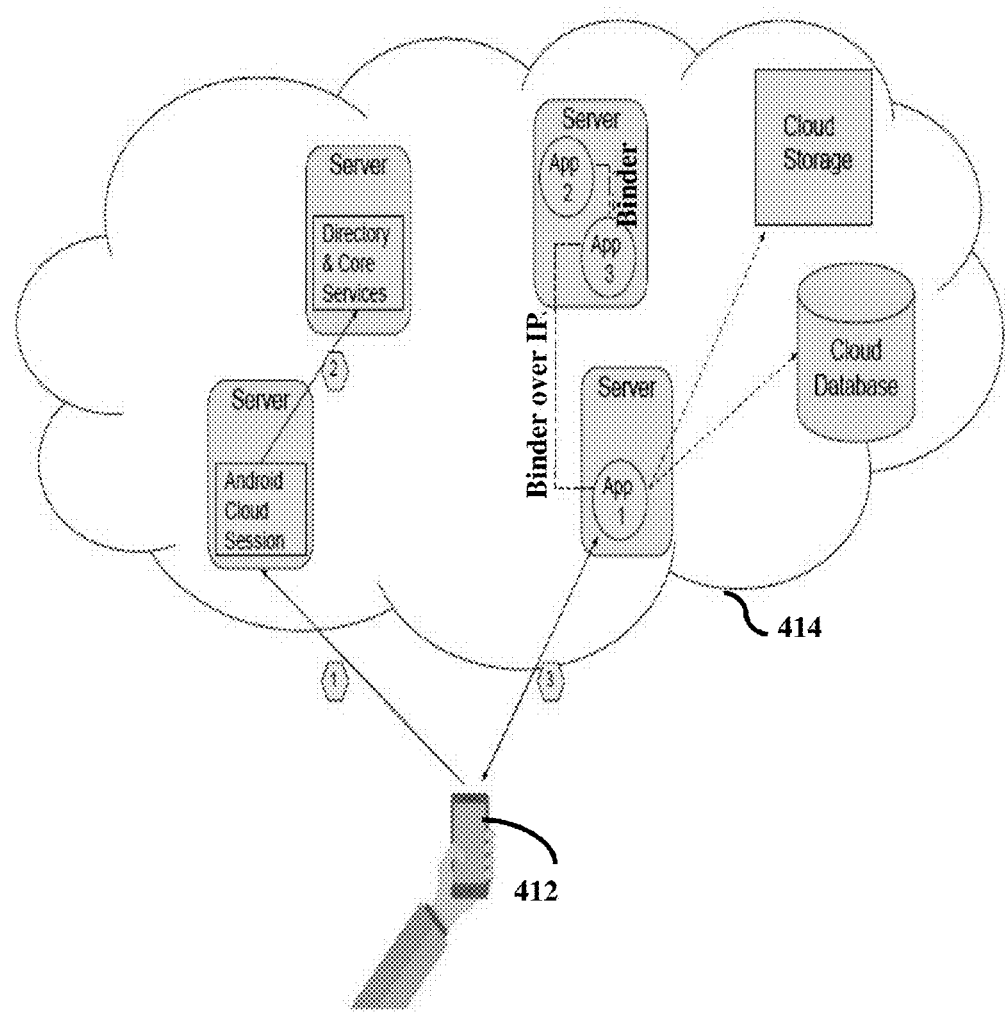
FIG. 4c is a block diagram illustrating a fully distributed cloud environment, according to the embodiments as disclosed herein.

FIG. 4c is a block diagram illustrating a fully distributed cloud environment, according to the embodiments as disclosed herein.

As shown in FIG. 4c, the user 412 installs an app on his/her computing device (for instance, smart phone, tablet and so on) to log in or establish a cloud session. The app then contacts the "Android Cloud Session" service in the cloud and validates the user's credentials (labeled as "1" in FIG. 4c).

The "Android Cloud Session" then communicates with "Directory & Core Services" to determine which apps the user is entitled to and where they will be hosted (labeled as "2" in FIG. 4c). Alternatively a library embedded in other apps running in the user's computing device can establish or connect to existing sessions. The "Directory & Core Services" maintains a list of apps a session is entitled to and the physical server hosting each app. This service also relocates apps to different hosts based on policy or in case of server failure.

To interact with apps running in the cloud there could be either independent apps in the user's computing device, each mapped to an individual app in the cloud or a single app which allows the user to switch between cloud apps (labeled as "3" in FIG. 4c). This/These app(s) redirects user input to the cloud and provide output (graphics, sound, haptic feedback, etc) for the apps running in the cloud. The local app also allows for cloud apps to interact with other apps in the local computing device (e.g. IPC, copy/paste, etc).

If communication is required between apps in the cloud they must consult the "Directory & Core Services" to find the physical host where the other app is present and use the correct "Binder" implementation to communicate with it.

Further, all data generated by the app while running in the cloud is stored in the cloud storage and database services. This allows for apps to be moved to any other physical host without lost of data. It allows for disaster recovery, resource management and security policies to be enforced.

Schematic Representation of Mixed Composition

Figure 5:
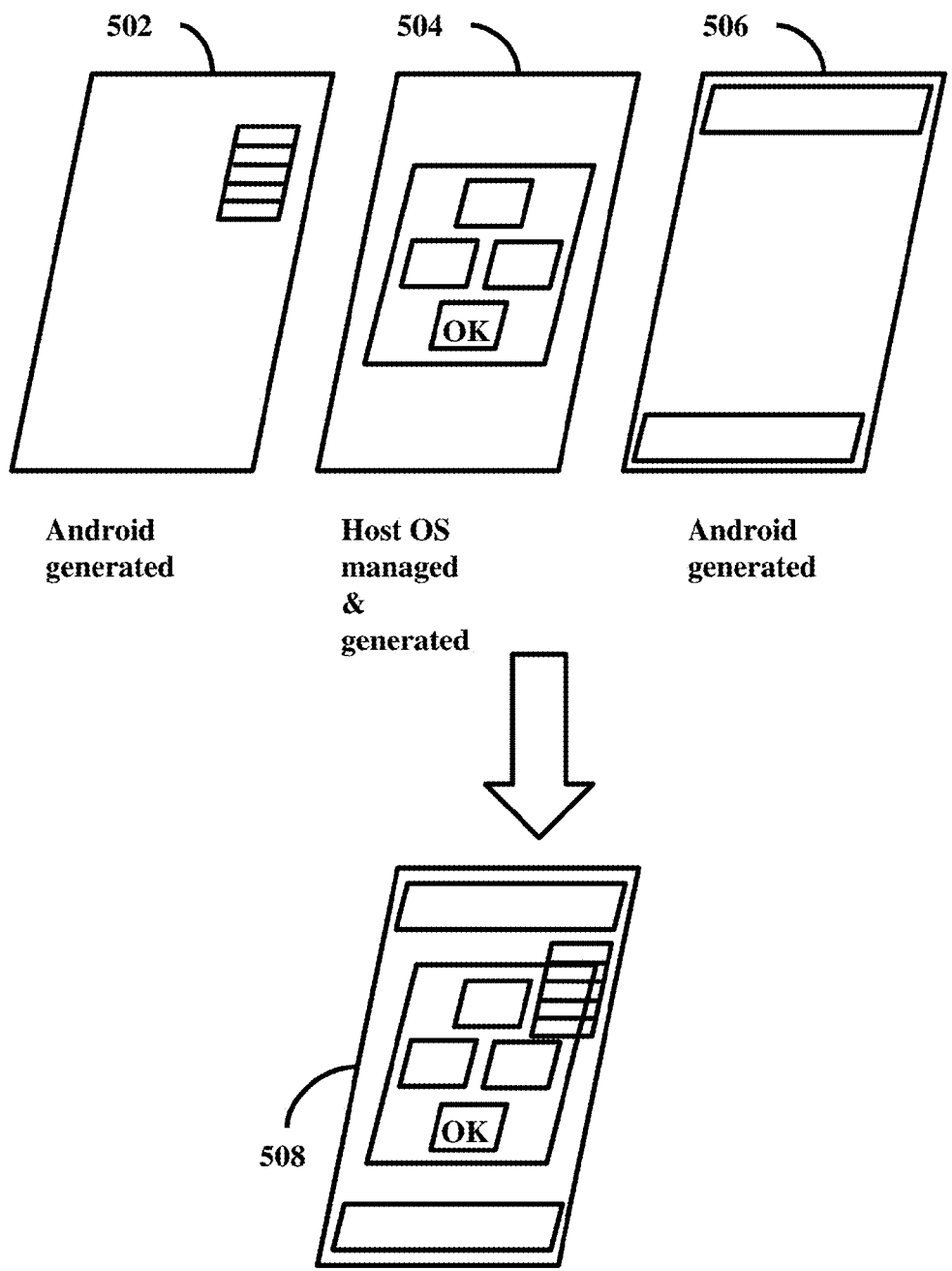
FIG. 5 is a schematic representation of a mixed composition feature, according to the embodiments as disclosed herein.

FIG. 5 is a schematic representation of an exemplary mixed composition feature, according to the embodiments as disclosed herein.

The mixed composition feature is the ability to mix Android generated with content created/managed by the Host OS to generate a final screen. Typically, a combination of Android and Host generated layers (layer 1 502, layer 2 504 and layer 3 506) in a screen is shown to a user. The layers are combined into a single frame 508 that the user can view and integrate. The combination and number of layers may is unlimited.

Exemplary Screenshot of Mixed Composition

Figure 6:
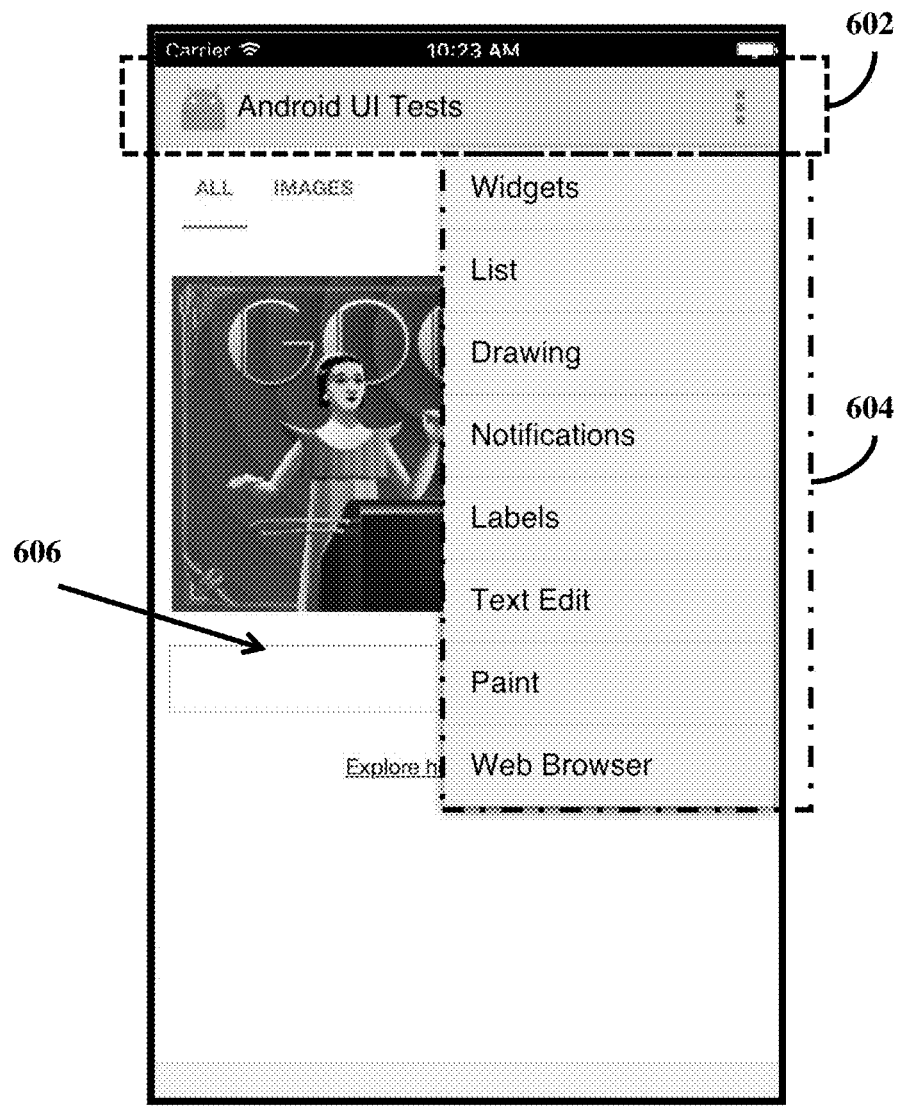
FIG. 6 is an exemplary screenshot of the mixed composition feature, according to the embodiments as disclosed herein.

FIG. 6 is an exemplary screenshot of the mixed composition feature, according to the embodiments as disclosed herein. The header 602 and popup menu 604 are created by Android while the web content (showing Google's homepage) 606 is created by the Host OS.

The header 602, the popup menu 604 and the web content 606 are all combined into a final screen without the user even realizing that intermixing is happening.

Further, the mixed composition feature is transparent to an app developer.

FIG. 7 shows the alternative implementations of the Binder Inter-Process Communication (IPC), according to the embodiments as disclosed herein.

FIG. 7 illustrates various Binder solutions as listed below:
a) Android Binder Usage 702. This method can be implemented if a Host OS allows the installation of kernel level drivers. Port of the Binder Driver to the Host OS to fully support the Binder IPC.
b) Single Process "Binder" Usage 704. When running in a single process Inter-Process Communication (IPC) mechanisms like Binder are not required. This method includes a way to transparently remove the usage of Binder without changing or affecting the functionality of the original app. Specifically, when running in a single process, both targets of the Binder communication are available within the process the data payload can be exchanged directly.
c) IPC Binder Usage 706. When running on environments where other IPC mechanisms are available this mechanism allows for replacing Binder with another IPC mechanism while maintaining the format of the data payload exchanged between apps.
d) Binder over IP Usage 708. In distributed environments like the cloud, Android apps may be running on different physical hosts. Binder calls will be encapsulated over IP and sent to physical host where the target of the communication is being executed.

System Block Diagram

Figure 8:
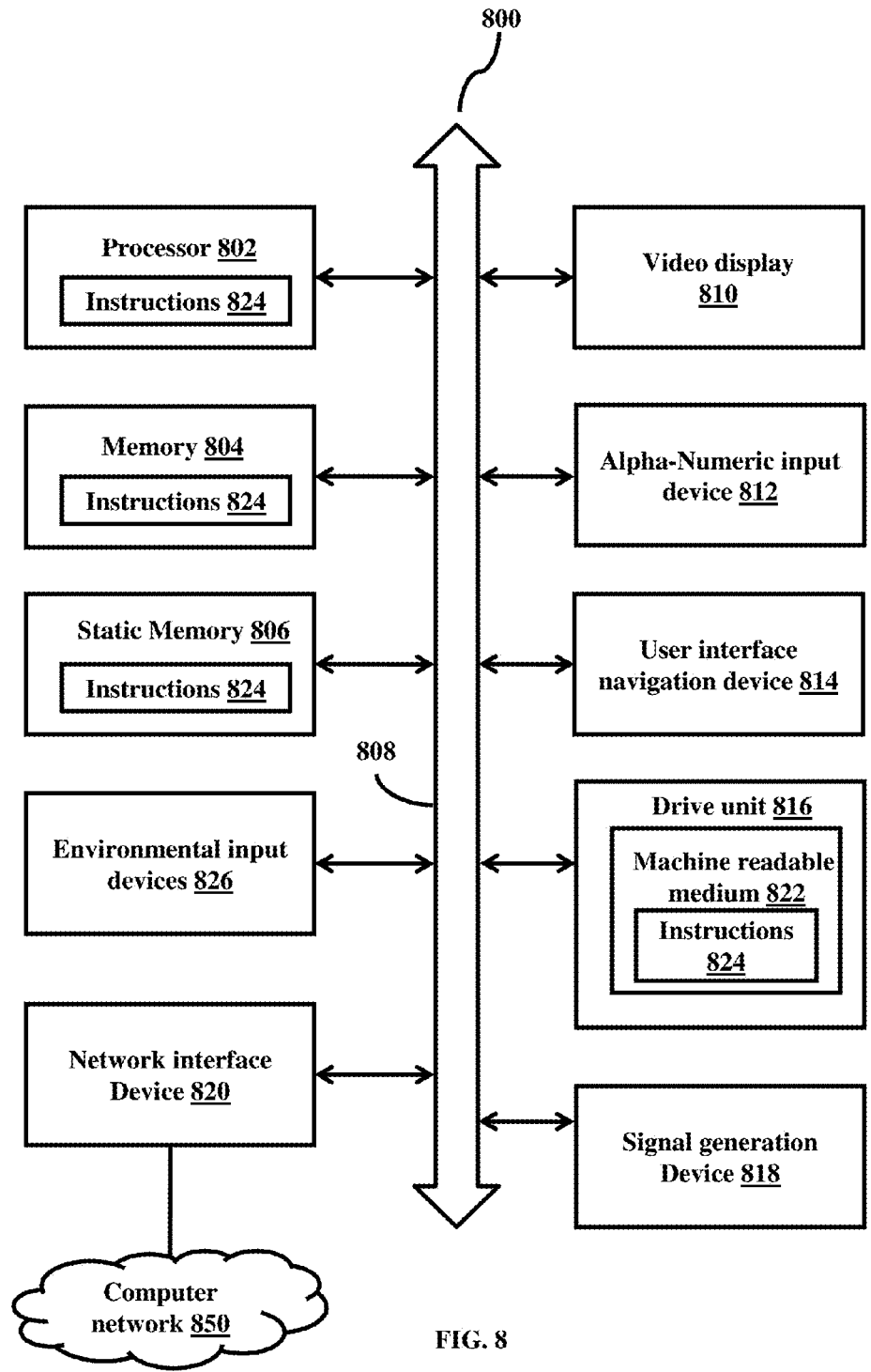
FIG. 8 is a block diagram of a machine in the example form of a computer system within which instructions for causing the machine to perform any one or more of the methodologies discussed herein may be executed.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820. The computer system 800 may also include a environmental input device 826 that may provide a number of inputs describing the environment in which the computer system 800 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 824 may further be transmitted or received over a computer network 850 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C™, C++™, C#™, Pascal™, Fortran™, Perl™, Matlab™ (from MathWorks), SAS™, SPSS™, JavaScript™, AJAX™, and Java™. The computer software product can be an independent application with data input and data display modules. Alternatively, the computer software products can be classes that can be instantiated as distributed objects. The computer software products can also be component software, for example Java Beans™ or Enterprise Java Beans™. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for executing Android apps natively on any environment, the computer-implemented method comprises:
   converting one or more Android applications to a binary format of other applications in a Host Operating System (OS), wherein the Android applications are in one of a source format and the binary format;
   replacing all equivalent components from a standard Android environment with ones provided by the Host OS thereby using the Host Operating System's capabilities;
   providing alternatives for running the Android apps that are automatically used based on the capabilities of the Host OS;
   implementing binder solutions, the binder solutions include one of Android Binder Usage, Single Process Binder Usage, Inter-Process Communication Binder Usage and Binder over IP Usage;
   executing the Android applications natively by the Host Operating System; and
   mixing Android generated with content created by the Host Operating System to generate a final screen, wherein a user views and interacts with the final screen;
   wherein Android services are configured to match the capabilities of the Host OS.

2. The computer-implemented method of claim 1 wherein the Android applications have same services and capabilities of other native applications running in the Host OS.

3. The computer-implemented method of claim 1 and further comprising:
   allowing the converted Android applications to be distributed and managed using regular tools, processes and procedures for the Host OS; and
   modifying the Android standard environment to run in a single process.

4. The computer-implemented method of claim 1 wherein the equivalent components is one of visual features, capabilities and services of the Host OS.

5. The computer-implemented method of claim 1 and further comprising:
   bundling the Android applications along with required components of Android framework and adapters to create an executable unit capable of being installed, launched, executed and managed by the Host OS.

6. The computer-implemented method of claim 5 wherein the components of the Android framework required to run the Android applications varies per application and the Host OS.

7. The computer-implemented method of claim 1 wherein the alternatives are one of a single runtime in the form of a static, shared library or framework and a cloud as a runtime environment for Android.

8. The computer-implemented method of claim 7 wherein running the Android apps in a cloud further comprises:
   redirecting app storage to cloud storage services;
   rendering commands to a remote computing device;
   accepting inputs from the remote computing device;
   redirecting output to the remote computing device;
   maintaining a directory of entitled apps per user;
   allowing every app for the user to run in a different physical host; and
   permitting an app to relocate dynamically as per customer admin defined policy without disrupting users.

9. A computer program product stored on a non-transitory computer readable medium that when executed by a processor, performs a method for executing Android apps natively on any environment, the computer program product comprises:
   converting one or more Android applications to a binary format of other applications in a Host Operating System (OS), wherein the Android applications are in one of a source format and the binary format;
   replacing all equivalent components from a standard Android environment with ones provided by the Host OS thereby using the Host Operating System's capabilities;
   providing alternatives for running the Android apps that are automatically used based on the capabilities of the Host OS;
   implementing binder solutions, the binder solutions include one of Android Binder Usage,
   Single Process Binder Usage, Inter-Process Communication Binder Usage and Binder over IP Usage;
   executing the Android applications natively by the Host Operating System; and
   mixing Android generated with content created by the Host Operating System to generate a final screen, wherein a user views and interacts with the final screen;
   wherein Android services are configured to match the capabilities of the Host OS.

10. The computer program product of claim 9 wherein the Android applications have same services and capabilities of other native applications running in the Host OS.

11. The computer program product of claim 9 and further comprising:
    allowing the converted Android applications to be distributed and managed using regular tools, processes and procedures for the Host OS; and
    modifying the Android standard environment to run in a single process.

12. The computer program product of claim 9 wherein the equivalent components is one of visual features, capabilities and services of the Host OS.

13. The computer program product of claim 9 and further comprising:
    bundling the Android applications along with required components of Android framework and adapters to create an executable unit capable of being installed, launched, executed and managed by the Host OS.

14. The computer program product of claim 13 wherein the components of the Android framework required to run the Android applications varies per application and the Host OS.

15. The computer program product of claim 9 wherein the alternatives are one of a single runtime in the form of a static, shared library or framework and a cloud as a runtime environment for Android.

16. The computer program product of claim 15 wherein running the Android apps in a cloud further comprises:
    redirecting app storage to cloud storage services;
    redirecting rendering commands to a remote computing device;
    accepting inputs from the remote computing device;
    redirecting output to the remote computing device;
    maintaining a directory of entitled apps per user;
    allowing every app for the user to run in a different physical host; and
    permitting an app to relocate dynamically as per customer admin defined policy without disrupting users;
    wherein Android services are configured to match the capabilities of the Host OS.

17. A system for executing Android apps natively on any environment, the system comprises:
   a computing device operated by a user;
   a processor coupled within the computing device and configured to perform the method of executing the Android apps natively on any environment: converting one or more Android applications to a binary format of other applications in
   a Host Operating System (OS), wherein the Android applications are in one of a source format and the binary format;
   replacing all equivalent components from a standard Android environment with ones provided by the Host OS thereby using the Host Operating System's capabilities;
   providing alternatives for running the Android apps that are automatically used based on the capabilities of the Host OS;
   implementing binder solutions, the binder solutions include one of Android Binder Usage, Single Process Binder Usage, Inter-Process Communication Binder Usage and Binder over IP Usage;
   executing the Android applications natively by the Host Operating System; and
   mixing Android generated with content created by the Host Operating System to generate a final screen, wherein a user views and interacts with the final screen;
   wherein Android services are configured to match the capabilities of the Host OS.

18. The system of claim 17 wherein the computing device further comprises:
   at least one adapter to convert data to and from the Host OS and Android; and
   a user interface for presenting the Android apps running natively on any environment to the user; and a network.

* * * * *